Figure 1:
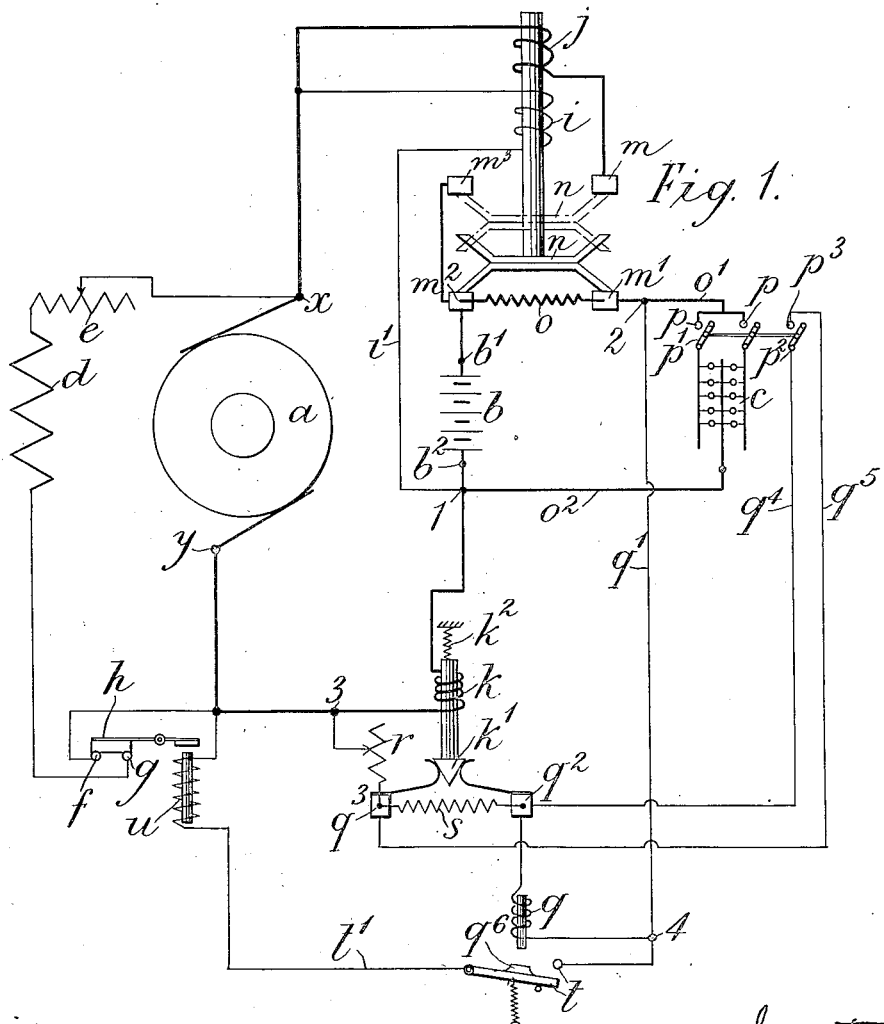

J. P. CROUCH & J. ETCHELLS.
ELECTRICAL DISTRIBUTION SYSTEM.
APPLICATION FILED DEC. 9, 1909.

1,029,428.

Patented June 11, 1912.

4 SHEETS—SHEET 1.

UNITED STATES PATENT OFFICE.

JOHN PEACHEY CROUCH, OF NEWTON HEATH, AND JAMES ETCHELLS, OF MANCHESTER, ENGLAND.

ELECTRICAL DISTRIBUTION SYSTEM.

1,029,428.      Specification of Letters Patent.      Patented June 11, 1912.

Application filed December 9, 1909. Serial No. 532,275.

*To all whom it may concern:*

Be it known that we, JOHN PEACHEY CROUCH and JAMES ETCHELLS, subjects of the King of Great Britain and Ireland, residing, respectively, at Newton Heath, in the county of Lancaster, England, and Moston, Manchester, in the county of Lancaster, England, have invented Improvements in or Relating to Electrical Distribution Systems, of which the following is a specification.

This invention relates to electrical distributing systems wherein electricity is supplied alternatively by a dynamo and a secondary battery or batteries which latter is or are adapted to be charged by the dynamo while the latter is supplying current to the distributing system.

The invention is more particularly applicable to cases where the speed of the dynamo is liable to fluctuate considerably, as found for example in train lighting systems, and it has for its object to provide a simple and efficient arrangement of means and connections for preventing the battery or batteries being overcharged and the voltage of the distribution circuits being unduly raised to the detriment of the lamps or other electric translating devices (hereinafter referred to as lamps) therein when the dynamo speed becomes excessive, when the current demand falls, or when any combination of circumstances renders such control automatically necessary. For this purpose, according to the present invention there are employed in conjunction with the dynamo, one or two secondary batteries, and the lighting or equivalent circuit to be supplied with current either from the dynamo or from one or both of the batteries, according to circumstances, electro-magnetic cut-out mechanism that is arranged to control the field circuit, or the armature circuit of the dynamo, a circuit for the said cut out mechanism that is subject not only to the voltage of the dynamo but also to that of the battery or batteries when the dynamo is at rest, or cut out, due to excessive speed, an electro-magnetic switch (hereinafter called for distinction the short circuiting switch) which alters the resistance of the circuit of the cut out mechanism depending upon whether it is being controlled by the dynamo or the battery and a compensating resistance for maintaining the resistance of the circuit of the cut out mechanism the same when connected to the dynamo while the lamps are out of use as it is when the lamps are in use. The arrangement is such that when the dynamo is supplying current to the battery, or one of the batteries, and, it may be, to the lighting circuit, should its voltage rise above the predetermined limit, the cut-out mechanism will automatically come into action to put the dynamo out of effective use, and the short circuiting switch will then act to reduce the resistance of the circuit of the cut out mechanism, which circuit will, at the same time, be connected across the poles of the battery or batteries so as to be controlled by such battery or batteries and enable it or them to maintain the dynamo circuit open until its or their voltage falls to the normal amount.

Means or apparatus to operate in the manner described can be constructed in various forms.

In the accompanying drawings, Figures 1 to 4 inclusive show diagrammatically various arrangements of apparatus embodying the invention.

In the example shown in Fig. 1, wherein a single dynamo $a$ and a single battery $b$ are adapted to supply a train lighting circuit $c$, the winding $d$ of the field magnet of the dynamo, having say a resistance $e$ in series therewith for regulating the output, is connected in shunt across the dynamo brushes $x$—$y$ through two stationary contacts $f$, $g$ and the movable blade $h$ of a knife switch forming part of the cut out mechanism, the function of such knife switch being to interrupt, when the battery is fully charged, the circuit of the field magnet $d$ when the speed and consequently the voltage of the dynamo becomes excessive. From the positive brush $x$ of the dynamo $a$ two principal circuits extend. One of these is by way of the shunt solenoid $i$ of a switch (hereinafter called for distinction the compound switch) having both a series solenoid $j$ and the shunt solenoid $i$, the latter being connected through a conductor $i^1$ and the solenoid coil $k$ of a short circuiting switch $k$, $k^1$ to the negative brush $y$ of the dynamo. The other circuit is by way of the series coil $j$ of the compound switch to one stationary contact $m$ thereof which, when the said switch is closed, as represented in dotted lines, thereby provides through the movable member $n$ of the switch a direct path to the positive terminal $b^1$ of the battery $b$ and an indirect path through a voltage reducing resistance $o$ (hereinafter called for distinction the lamp resistance) and the positive supply main $o^1$, to the fixed contacts $p$ of an external switch the movable contacts of which are shown at $p^1$. This external switch, when closed, connects up the supply main $o^1$ to the lamp circuit $c$, the negative supply main $o^2$ from the latter circuit being connected to a point 1 in the first named principal circuit between the shunt solenoid $i$ and the solenoid $k$ of the short circuiting switch $k$ $k^1$, to which point 1 the negative terminal $b^2$ of the battery is also connected.

The cut out mechanism comprises, in addition to the knife blade switch $f, g, h$ hereinbefore referred to, a voltage coil $q$ included in a circuit $q^1$ that extends from a point 2 in the positive supply main $o^1$ to one $q^2$, of a pair of stationary contacts $q^2$ $q^3$ forming part of the short circuiting switch $k$ $k^1$. The two contacts $q^2$ $q^3$ are connected by a resistance $s$, herein called the compensating resistance, which approximates in resistance value to the difference in resistance value of the lamp resistance $o$ when the lamp switch is closed and it is traversed by the lighting current and when the lamp switch is open and it is not traversed by the lighting current, so that it will cause a voltage drop in the circuit $q^1$, when in series circuit therewith, equal to the voltage drop in the lamp resistance $o$ when this resistance is in series with the lamp circuit $c$ and is supplying current thereto. From the contact $q^3$ the circuit is completed through a high resistance $r$ which is connected to the circuit between the solenoid $k$ and pole $y$ at the point 3. Contacts $q^2$ and $q^3$ are also connected to the movable and fixed members $p^2$ and $p^3$ respectively of a second short circuiting switch through conductors $q^4$ $q^5$. The switch contact $p^2$ is connected to the movable contacts $p^1$ of the external switch so that the short circuiting switch $p^2$ $p^3$ will be opened or closed when the external switch $p$ $p^1$ is opened or closed.

The voltage coil $q$ of the cut out mechanism is arranged to move an armature $q^6$ when the speed of the dynamo $a$, and consequently its voltage, exceeds a predetermined limit, and thereby close, as through a switch $t$, a circuit $t^1$ that proceeds from the positive side of the said coil $q$ to the negative terminal $y$ of the dynamo and includes an electro-magnet $u$ which, when energized, acts to open the cut-out knife switch $f g h$ and so open the circuit of the field $d$ of the dynamo. When the compound switch $i j$ is not energized, the movable switch member $n$ occupies the position shown in full lines and acts to short circuit the lamp resistance $o$. The arrangement is such that assuming the train to be at rest, then the stationary contacts $p^2$, $p^3$ of the short circuiting switch $k, k^1$ will be short circuited by the movable contact $k^1$ of such switch and a small current caused to flow from the positive pole $b^1$ of the battery $b$ by way of the stationary contact $m^2$, the movable member $n$ and the stationary contact $m^1$ of the compound switch $i j$ and the positive supply main $o^1$ through the circuit conductor $q^1$, voltage coil $q$, contacts $q^2$, $k^1$, $q^3$ and resistance $r$ of the cut-out mechanism in the circuit $q^1$ and the solenoid $k$ of the short circuiting switch $k$ $k^1$ to the negative pole $b^2$ of the battery, the movable element $k^1$ of the short circuiting switch being however loaded sufficiently, as by a spring $k^2$, to prevent it moving into the open position under this condition of working. Under this condition, assuming the battery $b$ is not fully charged, the switch $t$ will be open and the knife edge switch $f g h$ closed. If the external switch $p$, $p^1$ be closed at this time, the corresponding end of the lighting circuit $c$ will also be connected to the positive pole $b^1$ of the battery $b$ through the positive supply main $o^1$, switch contact $m^1$, movable member $n$ and contact $m^2$ and current can be obtained therefrom upon closing any of the lamp switches. The closing of the external switch $p$, $p^1$ will also close the switch $p^2$, $p^3$, so as to short circuit the compensating resistance $s$ but without causing any effect as such resistance is already short circuited by the switch member $k^1$.

Should the train start and the external switch $p$, $p^1$ be open, so that no lamps are alight, then, as soon as the dynamo $a$ acquires a speed high enough to charge the battery $b$ current will flow from the positive terminal $x$ of the dynamo through the solenoid $i$ of the compound switch $i j$ and through the conductor $i^1$ and solenoid $k$ to the negative pole $y$ of the dynamo. The solenoid $i$ will consequently be energized and raise the movable member $n$ of the compound switch into a position (indicated in dotted lines) to connect the positive terminal $b^1$ of the battery $b$ to the positive terminal $x$ of the dynamo through contacts $m^2$, $m^3$, member $n$, the contact $m$ and series solenoid $j$. The current from the negative pole $b^2$ of the battery, on its way to the negative terminal $y$ of the dynamo, will traverse the coil $k$ and cause the movable element $k^1$ of the short circuiting switch $k$ $k^1$ to rise and open the circuit $q^1$ of the voltage coil $q$ of the cut-out mechanism between the stationary contacts $q^2$ $q^3$ so that such circuit will then be completed through the compensating resistance $s$. The circuit of the voltage coil $q$ is then from pole $x$ of dynamo, solenoid $j$, switch contacts $m$, $n$, $m^3$, $m^2$, lamp resistance $o$, contact $m^1$ to supply main $o^1$ and thence through conductor $q^1$, coil $q$, contact $q^2$, compensating resistance $s$, contact $q^3$, resistance $r$ to the negative pole $y$ of the dynamo. Under these conditions it will be seen that both the lamp resistance $o$ and compensating resistance $s$ are included in the circuit $q^1$ of the voltage coil $q$.

The resistance $s$ is required to be thus inserted in series circuit with the voltage coil $q$ only when the dynamo is charging the battery and the lamps are not burning: if it were not employed, the voltage in the main $o^1$ would rise when the lamps were switched off, owing to there being then practically no voltage drop in the lamp resistance $o$, and such rise of voltage would energize coil $q$ and thus cause the dynamo to be cut out of action when it ought not to be and consequently there would be a "hunting" action. By the use of the compensating resistance $s$, which compensates for the loss of drop in the lamp resistance $o$, any such rise in voltage in the circuit $q^1$ of the voltage coil $q$, under the conditions of working mentioned, is prevented. If, on the other hand, the external switch $p$, $p^1$ be closed when the dynamo is in action, so that the lamp resistance $o$ is traversed by current, the short circuiting switch $p^2$ $p^3$ will also be closed and short circuit the compensating resistance $s$, thus putting the latter out of action. The resistance of the circuit of the voltage coil $q$ will however remain practically the same as before owing to the voltage drop that now takes place in the lamp resistance $o$ when the external switch $p$, $p^1$ is closed. The voltage coil is thus left ready to cut out the dynamo upon its voltage exceeding the desired value. The closing of the compound switch $i$ $j$ by the shunt coil $i$ causes current to flow through the series coil $j$ of the compound switch to the battery $b$ direct, as above stated, and indirectly through the lamp resistance $o$, contact $m^1$ and positive supply main $o^1$ to the lighting circuit $c$, and from the point 2 in such main $o^1$ to the circuit $q^1$ of the voltage coil $q$.

From the lighting circuit $c$ the current returns to the negative pole $y$ of the dynamo through the conductor $o^2$ and solenoid $k$. The circuit from point 2 of the main $o^1$ through the voltage coil $q$ to the negative pole $y$ is then through the parts $q^1$, $q$, $q^2$, $q^4$, $p^2$, $p^3$, $q^5$, $q^3$ and $r$.

As soon as the dynamo $a$ exceeds its predetermined speed and voltage, provided that the battery $b$ is fully charged, then the voltage coil $q$ of the cut-out mechanism will act to close the switch $t$, thereby closing the circuit $t^1$ of the electro-magnet $u$ of the cut-out switch $f$ $g$ $h$ which is then caused to open the circuit of the field $d$ of the dynamo and permit the movable member $n$ of the compound switch $i$ $j$ to move into a position to disconnect the battery from the dynamo. The battery will then supply current by way of contacts $m^2$, $n$ and $m^1$ direct through the positive supply main $o^1$ to the lamp circuit $c$, if closed, and also current to the circuit $q^1$ of the voltage coil $q$, the short circuiting switch $k$ $k^1$ then acting to short circuit the compensating resistance $s$ which, as before stated, is only in use while the dynamo is supplying current to the battery $b$ and the lamp circuit $c$ is open. The short circuiting of the compensating resistance $s$ reduces the resistance of the circuit of the voltage coil $q$ and enables the voltage of the battery to hold the cut out switch $f$, $g$, $h$ open and maintain the dynamo out of use. This condition obtains until the voltage of the battery $b$ falls to its normal amount, whereupon the voltage coil $q$ permits the switch $t$ to automatically open and the cut out switch $f$. $g$. $h$. to automatically close and thereby permit the dynamo to again supply current when running at the required speed.

Figure 2:
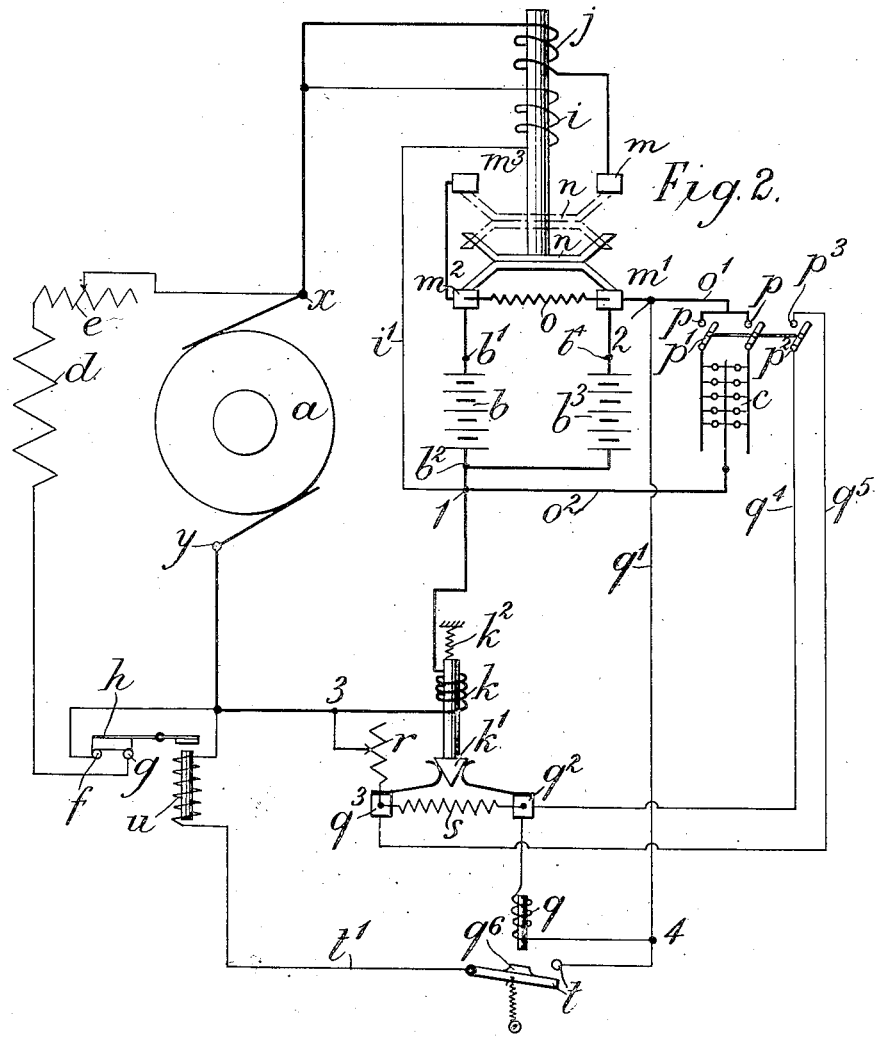

When two batteries are used as shown for example at $b$ and $b^3$ in Fig. 2 the positive terminal $b^4$ of the second battery $b^3$ may be connected to the switch contact $m^1$ between the lamp resistance $o$ and external switch $p$ $p^1$ its negative terminal being connected to the negative terminal of the first battery $b$.

Figure 3:
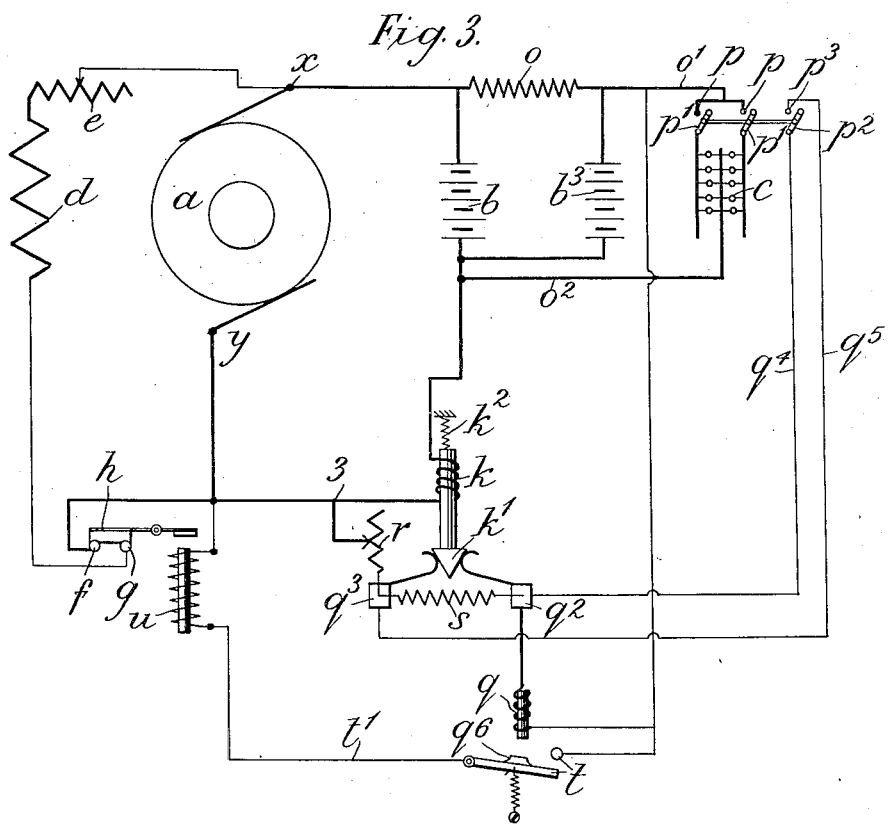

In some cases the compound switch $i$ $j$ may be dispensed with. Fig. 3 shows one arrangement of this kind in which two batteries $b$· $b^3$ are employed. In this example the positive brush $x$ of the dynamo $a$ is connected direct to the positive terminal of battery $b$ and through a lamp resistance $o$ to the positive terminal of the second battery $b^3$ and also to the positive supply main $o^1$ leading to the external switch $p$, $p^1$. The negative terminals of the two batteries are connected to the negative supply main $o^2$ and to one terminal of the solenoid $k$ of the short circuiting switch $k$ $k^1$ the other terminal of which is connected to the negative brush $y$ of the dynamo.

The arrangement is such that when the dynamo $a$ is running at the normal working speed and voltage, it will charge the battery $b$ and supply current through the lamp resistance $o$ to the positive supply main $o^1$ to which the positive terminal of the second battery, then acting as a regulating battery, is connected, and when the dynamo is at rest, or cut out because of its running above the normal working speed, the positive supply main $o^1$ will be supplied with current direct from the second battery $b^3$ and indirectly through the lamp resistance $o$ from the first battery $b$. The batteries may be reversed from time to time by a reversing switch operated in any known or suitable way, as by friction, upon reversal in the direction of running of the dynamo. In other respects the arrangement is similar to and acts in the same manner as the arrangement first hereinbefore described.

Figure 4:
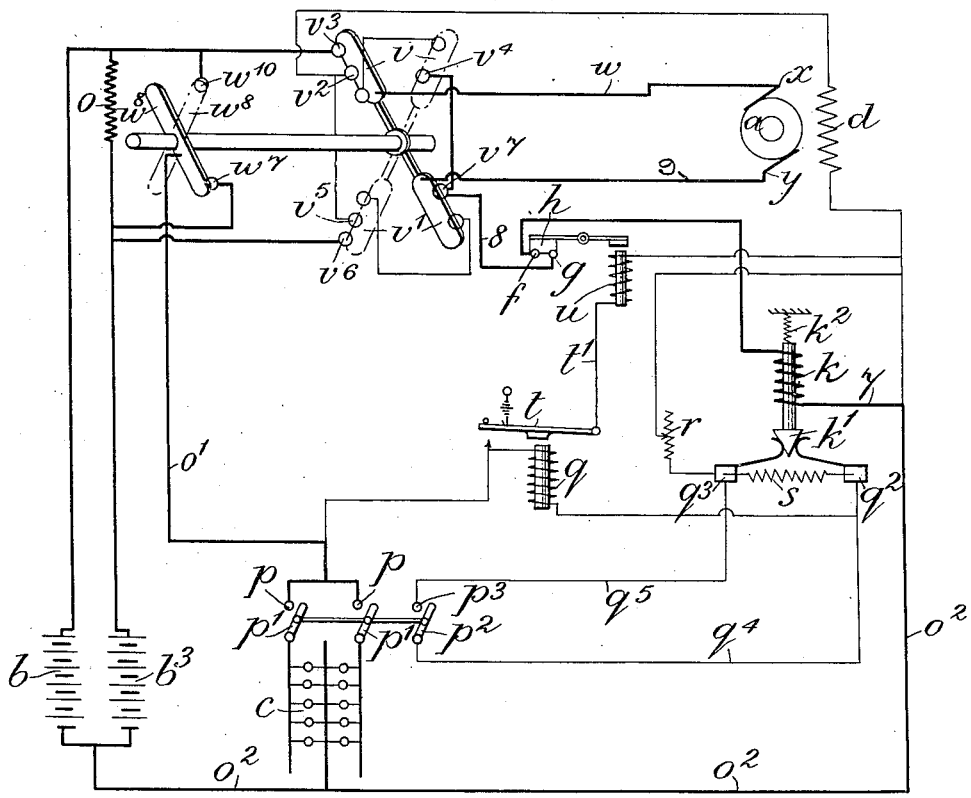

Automatic cut-out mechanism and short circuiting switch and connections such as hereinbefore described may be used in connection with various electric distributing systems. Thus, Fig. 4 shows the invention applied to a system in which the dynamo, battery and lighting circuits are controlled by a reversing switch comprising a rocking member that is turned into one position for forward running of the dynamo and into a reverse position for backward running by friction as in known systems of train lighting, the cut out switch $f$, $g$, $h$ being in this case, arranged to open the circuit of the armature. In applying such a reversing switch in carrying out the present invention, the switch contacts and connections require some modification as will appear from Fig. 4. In the example shown, the reversing switch comprises, as usual, two movable contacts $v$ $v^1$, two upper fixed contacts $v^2$, $v^3$, at one side of the upper movable contact $v$ and an upper fixed contact $v^4$ at the other side of contact $v$; two lower fixed contacts $v^5$ and $v^6$ at one side of the lower movable contact $v^1$ and a lower fixed contact $v^7$ at the opposite side of the contact $v^1$. The other contacts of the ordinary reversing switch shown are not necessary for the present invention. Contacts $v$ and $v^1$ are respectively connected by conductors $w$ and 9 to the poles $x$ and $y$ of the dynamo $a$. The upper contact $v^2$ is connected to the lower contact $v^5$ and also to one end of the field winding $d$ the other end of which is connected through the conductor 7, solenoid $k$, cut out switch $f$ $g$ $h$ and conductor 8 to the lower contact $v^7$ which is connected to the upper contact $v^4$. The upper contact $v^3$ is connected direct to the positive pole of battery $b$ and indirectly through the lamp resistance $o$ to the positive pole of battery $b^3$, the negative poles of these batteries being connected to the negative return conductor $o^2$ which is connected to the aforesaid conductor 7. The lower contact $v^6$ is connected direct to the positive pole of battery $b^3$. $w^8$ is the movable member of a supplementary switch $w^7$, $w^8$, $w^{10}$ and is connected to the carrier for the movable switch contacts $v$, $v^1$ of the reversing switch so as to move therewith. Contact $w^7$ is directly connected to the positive pole of battery $b^3$, contact $w^{10}$ is directly connected to the positive pole of battery $b$ and also to the upper contact $v^3$ of the reversing switch, and contact $w^8$ is directly connected to the positive supply main $o^1$ which is adapted to be connected, as before, through the external switch $p$, $p^1$ to the lighting circuit $c$ from which the negative lead $o^2$ extends to the conductor 7. The lamp resistance $o$ is connected between the contacts $w^7$ and $w^{10}$. $q$ is the voltage coil connected at one end to the positive supply lead $o^1$ and at the other end to the contact $q^2$ of the short circuiting switch the second terminal $q^3$ of which is connected through the resistance $r$ to the conductor 7, the two contacts $q^2$ $q^3$ being connected together through the compensating resistance $s$. This resistance is arranged to be short circuited, as before, by the movable contact $k^1$ of the switch $k$ $k^1$ when the dynamo is at rest or cut out, and also by the switch $p^2$ $p^3$ and conductors $q^4$, $q^5$, when the dynamo is charging one of the batteries $b$, $b^3$ and the external switch $p$ $p^1$ is closed but which is included in the circuit of the voltage coil $q$ when the dynamo is charging one of the batteries and the external switch $p$ $p^1$ is open, as hereinbefore explained. $u$ is the electro-magnet for opening the cut-out switch $f$, $g$, $h$ when the voltage coil $q$ acts to close the switch $t$ upon the voltage of the dynamo rising above the predetermined amount.

The arrangement is such that when the movable contacts $v$ $v^1$ of the reversing switch are turned into the position shown in full lines in Fig. 4, the movable contact $w^8$ of the supplementary switch $w^7$, $w^8$, $w^{10}$ will also be turned into the position shown in full lines in that figure. With the parts in this position, the field winding $d$ is connected in shunt to the poles $x$ $y$ of the dynamo through the parts $w$, $v$, $v^2$, 7, $k$, $f$ $g$ $h$, 8, $v^7$, $v^1$ and 9. If the dynamo $a$ be running at a speed sufficient to charge battery $b$, then current will flow from pole $x$ through this battery by the path $w$, $v$, $v^3$, $b$, $o^2$, 7, $k$, $f$ $g$ $h$, 8, $v^7$, $v^1$ and 9 to pole $y$, the switch contact $k^1$ being then moved into a position to open the circuit between contacts $q^2$ and $q^3$. If at this time the external switch $p$ $p^1$ be open and there is no voltage drop in the lamp resistance $o$, the compensating resistance $s$ will be in circuit to maintain the resistance of the voltage coil $q$ suitable for controlling the circuit of the dynamo. Should the external switch $p$ $p^1$ be closed for supplying current to the lamp circuit $c$, the lamp resistance $o$ will become effective to control the voltage coil $q$ and the compensating resistance $s$ will be short circuited by the switch $p^2$, $p^3$ and conductors $q^4$, $q^5$. Under these conditions, battery $b^3$ will supply current to the lamp circuit $c$, the circuit of the battery $b^3$ being through $w^7$, $w^8$, $o^1$, $p$, $p^1$, $c$ and $o^2$. If the dynamo be at rest or cut out, battery $b^3$ will supply current direct to the lighting circuit through the path just mentioned, and battery $b$, being the one last charged and therefore having its full E. M. F., will supply current to the lighting circuit through the lamp resistance $o$ and switch contacts $w^7$ $w^8$.

When the reversing switch contact $v$ $v^1$ and supplementary switch contact $w^8$ are turned into the positions shown in dotted lines in Fig. 4, corresponding to reversal in direction of running of the dynamo, the circuit of the field winding $d$ will be from pole $y$ through 9, $v^1$, $v^5$, $v^2$, 7, $k$, $f$ $g$ $h$, 8, $v^7$, $v^4$, $v$, $w$ to pole $x$. Battery $b^3$ will be connected across the poles $y$ $x$ through 9, $v^1$, $v^6$, $o^2$, 7, $k$, $f$ $g$ $h$, 8, $v^7$, $v^4$, $v$ and $w$ to pole $x$. If the external switch $p$ $p^1$ is open at this time, there will be no voltage drop in the lamp resistance $o$, but the compensating resistance $s$ will be effective to maintain the resistance of the circuit of such coil as before. If the external switch $p$ $p^1$ be closed, current will at the same time flow from pole $y$ to the lighting circuit $c$ through 9, $v^1$, $v^6$, $o$, $w^{10}$, $w^8$, $o^1$ and $p$ $p^1$, and return through $o^2$, 7, $k$, $f$ $g$ $h$, 8, $v^7$, $v^4$, $v$, and $w$ to pole $x$, and the compensating resistance $s$ will be short circuited. Current will at the same time flow from the positive pole of battery $b$ to the lighting circuit $c$ through $w^{10}$, $w^8$, $o^1$ and $p$ $p^1$ and return through $o^2$ to the negative pole of the said battery. If the dynamo $a$ be at rest, current can, upon closing the switch $p$ $p^1$, be supplied to the supply main $o^1$ and lighting circuit $c$ direct from the battery $b$ through contacts $w^{10}$ and $w^8$ and indirectly from the last charged battery $b^3$ through the lamp resistance $o$ and contacts $w^{10}$ and $w^8$.

The details of construction can be variously modified.

What we claim is:—

1. In an electrical distributing system, a consumption circuit, a secondary battery adapted to supply the consumption circuit, a voltage reducing resistance, a dynamo adapted to supply the consumption circuit through said voltage reducing resistance and simultaneously charge the battery, an electro-magnetic cut out for the dynamo, a switch in the circuit of the electromagnet of the cut out, a voltage coil operating such switch, a compensating resistance adapted to be connected in series with the voltage coil when the dynamo is supplying the battery and the consumption circuit is open, an electro-magnetic switch normally short circuiting the compensating resistance when the dynamo is not supplying the battery and consumption circuit, and a switch opened and closed with opening and closing of the consumption circuit and adapted to short circuit the compensating resistance when the consumption circuit is closed and to open the short circuit of the compensating resistance when the consumption circuit is open.

2. In an electrical distributing system, the combination with a dynamo, a secondary battery and a consumption circuit of electromagnetic cut out mechanism controlling the dynamo, a circuit for such cut out mechanism, a voltage switch for opening and closing such circuit, a second circuit, including the voltage coil of the voltage switch, subject to the voltage of the dynamo and also to the battery voltage when the dynamo is at rest or cut out, a voltage reducing resistance in connection with such second circuit, a compensating resistance also in connection with the said second circuit, an electromagnetic switch adapted to short circuit the compensating resistance when the dynamo voltage falls below a predetermined value or is cut out so as to then reduce the resistance of the circuit of the coil of the voltage switch, and a switch closed with closure of the consumption circuit for short circuiting the compensating resistance and maintaining the total resistance of the circuit of the voltage coil the same when the consumption circuit is open and the voltage reducing resistance is not in effective use as when the consumption circuit is completed and the voltage reducing resistance is in effective use.

3. An electrical distributing system comprising a dynamo and a consumption circuit, two batteries connected at one end to one pole of the dynamo and to one end of the consumption circuit and having their other ends respectively connected to the dynamo and consumption circuit and joined together through a resistance, an electromagnetic cut out mechanism controlling the dynamo, a circuit for such cut out mechanism, a voltage switch for opening and closing such circuit, a second circuit, including the voltage coil of the voltage switch, subject to the voltage of the dynamo and also to the battery voltage when the dynamo is at rest or cut out, a compensating resistance in connection with said second circuit, an electromagnetic switch adapted to short circuit the compensating resistance when the dynamo voltage falls below a predetermined value or is cut out so as to then reduce the resistance of the circuit of the coil of the voltage switch, and a switch closed with closure of the consumption circuit for short circuiting the compensating resistance and maintaining the total resistance of the circuit of the voltage coil the same when the consumption circuit is open and the voltage reducing resistance is not in effective use as when the consumption circuit is completed and the voltage reducing resistance is in effective use.

4. An electrical distributing system comprising a dynamo and a consumption circuit, two batteries connected at one end to one pole of the dynamo and to one end of the consumption circuit and having their other ends respectively connected to the dynamo and consumption circuit and joined together through a resistance, means for interchanging the connections of the said batteries with the consumption circuit and dynamo respectively automatically with reversal in direction of rotation of the dynamo, an electromagnetic cut out mechanism controlling the dynamo, a circuit for such cut out mechanism, a voltage switch for opening and closing such circuit, a second circuit, including the voltage coil of the voltage switch, subject to the voltage of the dynamo and also to the battery voltage when the dynamo is at rest or cut out, a compensating resistance in connection with said second circuit, an electromagnetic switch adapted to short circuit the compensating resistance when the dynamo voltage falls below a predetermined value or is cut out so as to then reduce the resistance of the circuit of the coil of the voltage switch, and a switch closed with closure of the consumption circuit for short circuiting the compensating resistance and maintaining the total resistance of the circuit of the voltage coil the same when the consumption circuit is open and the voltage reducing resistance is not in effective use as when the consumption circuit is completed and the voltage reducing resistance is in effective use.

5. An electrical distributing system comprising a dynamo, a consumption circuit, a secondary battery, a current supply main between the positive side of said battery and the positive side of said consumption circuit, a resistance in circuit with said supply main, an external switch between said supply main and consumption circuit, means connecting the dynamo to the positive pole of said battery and indirectly through said resistance to said supply main, a short circuiting switch having its winding connected at one end to the negative pole of the battery and negative side of the consumption circuit and its other end to the negative pole of the dynamo and comprising a movable contact and two fixed contacts normally connected by the movable contact, a compensating resistance connected between said fixed contacts, a voltage coil having one terminal connected to one of the said fixed contacts and its other end connected to the said supply main on the consumption circuit side of the resistance in circuit therewith, a resistance between the second fixed contact and the negative pole of the dynamo, an electromagnetic cut out for the dynamo, and a switch controlling the circuit of said cut out and itself controlled by said voltage coil, said external switch being adapted to short circuit said compensating resistance when it closes the consumption circuit.

Signed at London England this 19 day of November 1909.

JOHN PEACHEY CROUCH.
JAMES ETCHELLS.

Witnesses:
HERBERT D. JAMESON,
B. WILLIAMS.